United States Patent

[11] 3,603,155

[72] Inventors Charles William Morris
Los Angeles;
John Raymond Ulyate, Torrance, both of, Calif.
[21] Appl. No. 7,734
[22] Filed Feb. 2, 1970
[45] Patented Sept. 7, 1971
[73] Assignee Chromalloy American Corporation
West Wyack, N.Y.

[54] METHOD AND APPARATUS FOR MASS EMISSION SAMPLING OF MOTOR VEHICLE EXHAUST GASES
22 Claims, 4 Drawing Figs.

[52] U.S. Cl. .................................................. 73/421.5 R, 73/23
[51] Int. Cl. .................................................. G01n 1/22
[50] Field of Search .......................................... 73/421.5, 23

[56] References Cited
UNITED STATES PATENTS

| | | | |
|---|---|---|---|
| 1,494,855 | 5/1924 | Michael ...................... | 73/421.5 A |
| 2,013,998 | 9/1935 | Goldsborough .............. | 73/421.5 |
| 3,461,727 | 8/1969 | Everhard ..................... | 73/421.5 |

FOREIGN PATENTS

| | | | |
|---|---|---|---|
| 1,237,783 | 6/1960 | France ......................... | 73/422 TC |

*Primary Examiner*—S. Clement Swisher
*Attorney*—Miketta, Glenny, Poms and Smith

ABSTRACT: An air blower draws a mixture of exhaust gases emitted from an internal combustion engine and ambient air through a through-flow duct having a valve means therein at a minimum volumetric flow rate for the mixture in excess of the maximum volumetric flow rate the engine is capable of emitting while a proportional sample of said total mixture is withdrawn into a sample container at a uniform volumetric rate during a test period, the sample thereafter being analyzed to determine the concentration of pollutants of gas constituents therein and compared with the concentration of such pollutants or gas constituents in the ambient air which is sampled concurrently at the same flow rate from an area adjacent that where the ambient air is drawn into the through-flow conduit, total mass or weight of such pollutants or constituents being calculable from the concentration thereof in said sample and the known total mass or weight of air and gas mixture drawn through the duct.

Temperature sensing and transducer means produce a first or error signal which is a function of the temperature of gases flowing through said duct, volumetric flow rate sensing means and associated transducer means produce a second signal which is a function of volumetric gas flow through the duct and electrical circuit means are provided in association therewith to cause said second signal to modify said first signal to produce a control signal which causes operation of a servomotor to adjust the valve means until an actual required volumetric flow rate through the duct is attained for any given temperature thereof to maintain a constant mass or weight flow, said actual volumetric flow rate for said gases increasing with increasing gas temperatures above a standard initial flow rate for a standard temperature condition.

Circuitry is provided for a system for maintaining constant the rate of mass flow of a gas through a conduit despite temperature changes. The system generates an error signal linear with the absolute temperature of the gas, generates a second signal which is linear with differential pressure across a fixed orifice in the conduit, and thus with velocity of flow therein, modifies the error signal by the second signal to produce a command signal of appropriate polarity to adjust the velocity of gas flow in an inverse feedback manner by controlling a throttling valve in the conduit.

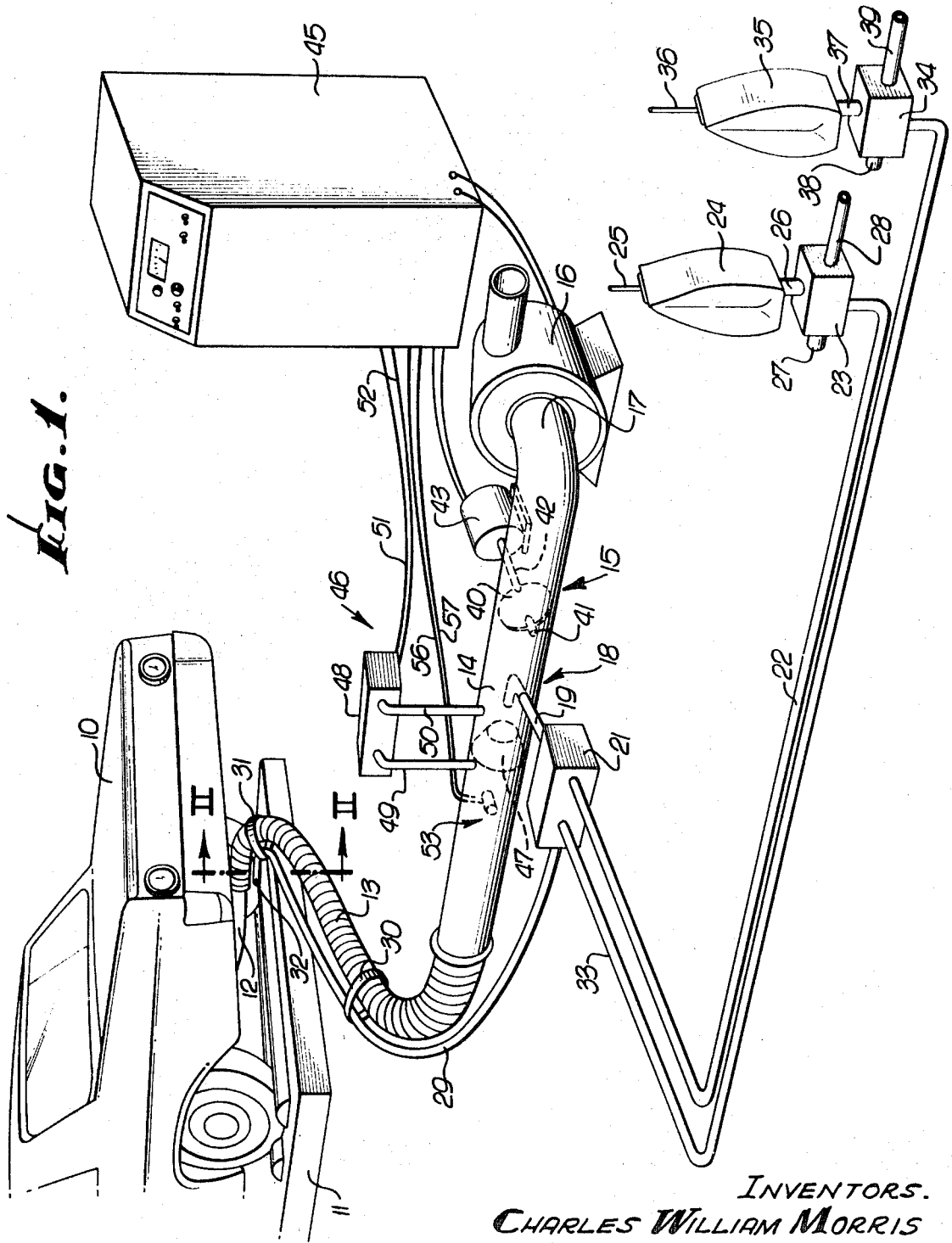

INVENTORS.
CHARLES WILLIAM MORRIS
JOHN RAYMOND ULYATE
BY
Miketta, Glenny, Poms & Smith
ATTORNEYS.

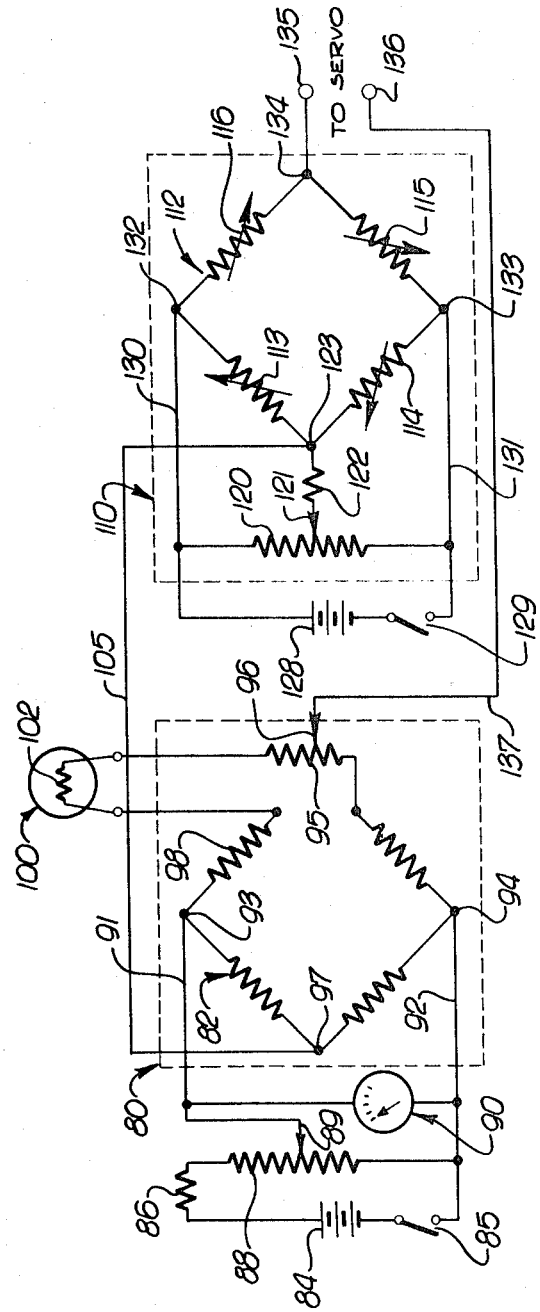

METHOD AND APPARATUS FOR MASS EMISSION SAMPLING OF MOTOR VEHICLE EXHAUST GASES

BACKGROUND OF THE INVENTION

With increasing public awareness of the problem of air pollution caused by emissions from internal combustion engines of vehicles, various state legislatures and agencies are developing and requiring adherence to higher standards for vehicle emissions. In the past, it has been necessary only to determine the concentration, or percentage, of a given pollutant or constituent in the exhaust gas being emitted from the engine of a vehicle without regard to the volume of exhaust or the rate at which it is being emitted. However, there is a developing concern that vehicles with large engines will expel a greater amount of exhaust gas and hence will emit a greater amount of pollutant than would a car having only a small engine. It is therefore desirable to be able to measure the total quantity of emissions per mile travelled for a vehicle to obtain a true indication of the polluting effect of such vehicle.

A sequence of operations for testing vehicles under dynamic or operating conditions has been developed by the California Air Resources Board and the National Center for Air Pollution Control, commonly referred to as the seven-mode cycle. The vehicle is operated on a chassis dynamometer apparatus under various operating conditions to simulate normal driving conditions. During such operations of the vehicle, the total exhaust emissions and ambient air may be drawn through a sampling device to obtain a sample thereof by what may be referred to as a dilution sampling method. However, we have found that the fluctuation of temperature of the air and exhaust gas mixture passing through the testing or sampling apparatus prevents the collection of a true proportional sample of such mixture during a testing operation. The dilution sampling of the present approach requires a uniform weight or mass flow of the air and exhaust mixture drawn through the testing apparatus. The varying temperatures and volume of exhaust gas in the different test modes causes the temperature of the air and gas mixture to range over several hundred degrees during a given test. To eliminate these effects on gas density, others have considered the incorporation of large heat exchangers in an attempt to maintain a constant temperature of the air and gas mixture during a test period. It is believed that these efforts have failed and that a true proportional sample of a constant mass or weight flow of exhaust and air mixtures through a testing apparatus have not heretofore been obtained.

It is therefore the primary object of the present invention to disclose and provide methods and apparatus for maintaining a constant mass or weight flow of diluted exhaust gases through a test apparatus, including a flow-through duct or conduit, during a test period and to obtain a true proportional sample thereof during such test period so that the total mass of a given pollutant or constituent in said exhaust gases can be computed by multiplying the concentration of such pollutant found in the sample obtained times the total mass or weight or exhaust gases and air passing through the duct during the test, the latter value being determined from an initially established volumetric flow rate established for conducting the test.

It is another object of the present invention to disclose a method and apparatus as in the foregoing object wherein a valve means is provided within the through-flow duct for modifying such initially established volumetric flow rate during a test in response to changing exhaust gas temperatures in order to maintain a constant mass or weight flow of said gases through the duct.

It is another object of the present invention to disclose and provide methods and apparatus as in the foregoing objects wherein the operation of the valve means in the duct is controlled in response to the volumetric flow rate of exhaust gases through said duct in addition to the temperature of said gases in said duct.

It is still a further object of the present invention to disclose and provide methods and apparatus as in the foregoing objects wherein temperature sensor and transducer means are provided in association with the duct for producing a first or error signal which is a function of the temperature of exhaust gases flowing through said duct and volumetric flow rate sensor and transducer means are also associated with said duct for producing a second modifying signal which is a function of volumetric flow rate of exhaust gases passing through said duct, and wherein the first command signal is modified by said modifying signal to produce a control or command signal that operates the valve means to produce the proper volumetric flow rate through the duct for a given nonstandard temperature condition after an initial standard flow rate has been established for a standard temperature condition.

These and other objects of the present invention will become better understood by those skilled in the art from a consideration of the detailed explanation of a preferred exemplary embodiment of the invention set forth hereinafter.

SUMMARY OF THE INVENTION

A vehicle to be tested is mounted on a dynamic testing rig such as is described in U.S. Letters Pat. No. 3,491,587 in which the test rig simulates the inertia of the vehicle in normal operation on the street or highway. The vehicle is operated to follow a prescribed test procedure such as is established by he California Air Resources Board and the National Center for Air Pollution Control. All of the vehicle exhaust gases are drawn into the intake of a through-flow duct having an associated air blower means. The intake opening to the through-flow duct is larger than the vehicle exhaust pipe it surrounds so as to allow the inflow of ambient air in addition to the exhaust emissions of the vehicle. Air and exhaust gas volumetric flow through the through-flow duct is maintained at a minimum value greater than the maximum volumetric exhaust flow the engine is capable of so that ambient air surrounding the exhaust pipe is always drawn into the duct, insuring that all exhaust gases are included in the sampling method.

Constant mass or weight flow of air and gas mixture through the through-flow duct is maintained during a testing procedure by varying the actual volumetric flow from an initial flow rate in response to change in gas temperature from an initial ambient air temperature. Valve means are provided within the duct for controlling the volumetric flow rate of gases through the duct for any given setting of the associated blower means and valve control means are associated therewith for operating the valve to provide a constant mass or weight flow of air and gas mixture through the duct during a testing period.

Temperature sensing means are associated with the duct for sensing the temperature of gases passing through the duct and a temperature transducer means is provided for producing a first signal which is a function of the temperature of gases passing through the duct at any given instant during operation thereof. Volumetric flow rate sensing means are also associated with the duct for sensing the volumetric flow rate of gases passing through the duct and a transducer means associated therewith is provided for producing a second or modifying signal which is a function of the volumetric flow rate of gases passing through the duct. The second signal is used to modify the first signal to produce a control or command signal, which is a function of both temperature and volumetric flow rate of gases through the duct, to operate a motor means for adjusting the position of the valve means in the duct as the temperature of gases flowing through the duct changes. As the gas temperatures rise, the valve means is opened to increase the actual volumetric flow rate of the air and gas mixture to maintain a constant mass or weight flow while, on the other hand, as the temperature drops, the valve means is moved toward a closed position until a lower actual volumetric flow rate for the mixture is attained for the lower temperature to again maintain a constant mass or weight flow of air-gas mixture through the duct.

The sampling tube is located in the duct to withdraw a proportional sample of air gas mixture at a constant rate from the duct during the time of a testing period. The withdrawn proportional sample is directed by a positive displacement pump into a container or sample bag. At the completion of a test, the contents of the sample bag are passed through a gas analyzer apparatus to determine the concentration of an exhaust gas pollutant or constituent in the sample. Total mass or weight of such pollutants or gas constituents are then determinable by multiplying the sample concentration times the total mass of air and gas mixture passed through the duct, which has been maintained at a constant known rate for a known period of time during the test.

Further, in accordance with the present invention, a sample of ambient air is taken concurrently with the sampling of the air-gas mixture which can be compared with the air-gas sample to determine the actual mass or weight of pollutants or gas constituents added by the vehicle engine to that contained in the ambient air.

A more complete understanding of the methods and apparatus of the present invention will be afforded to those skilled in the art from a consideration of the following detailed explanation of a preferred exemplary embodiment of the method and apparatus for mass emission sampling of motor vehicle exhaust gases according to the present invention. Reference will be made to the appended sheets of drawings in which:

FIG. 1 is a perspective view of the preferred exemplary embodiment of apparatus for mass emission sampling of a motor vehicle exhaust gas emissions, according to the present invention, shown connected to the exhaust system of a conventional vehicle positioned upon a vehicle dynamometer;

FIG. 4 is a schematic diagram of an exemplary circuit employed in the apparatus of the present invention.

Figure 3:
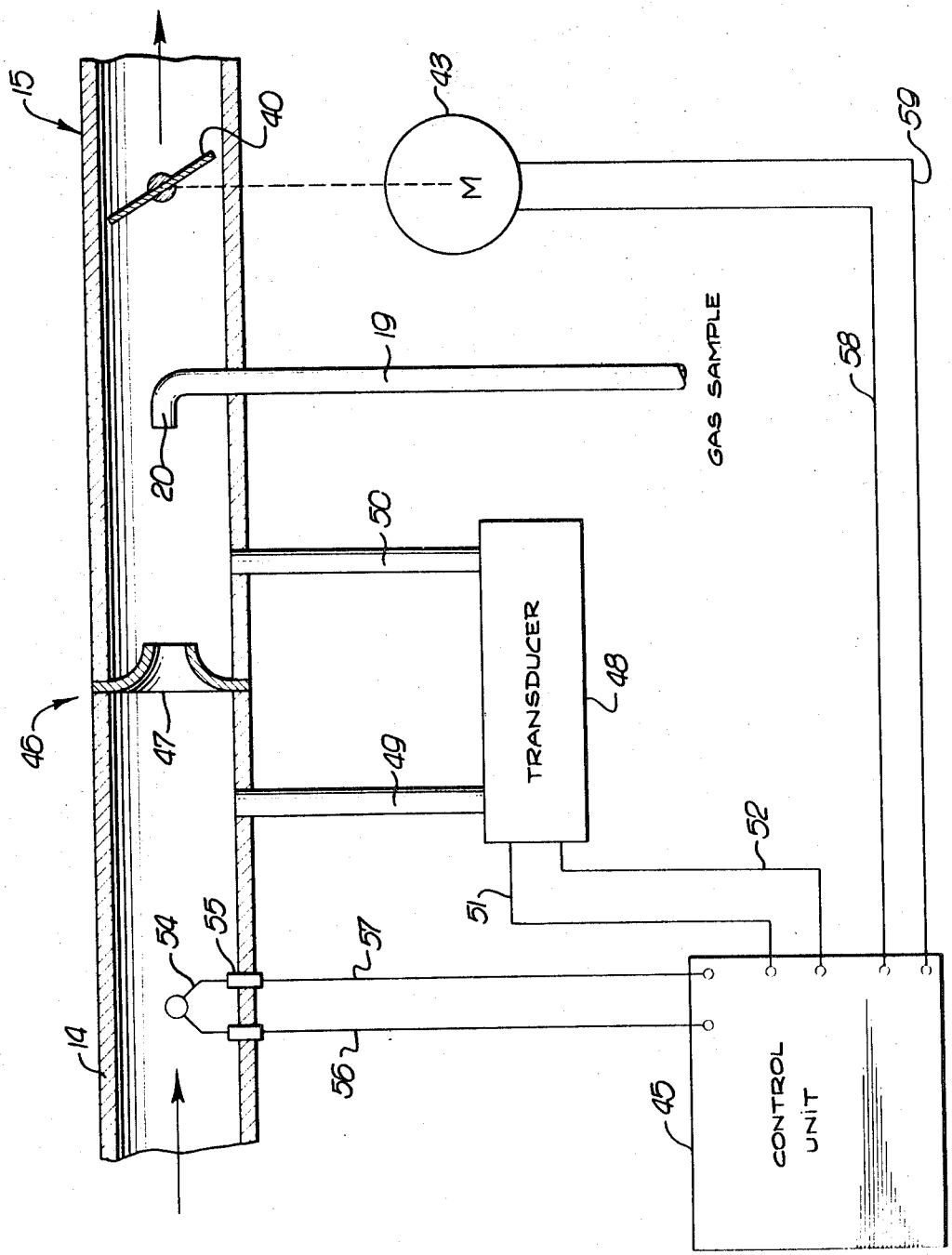
FIG. 3 is a somewhat schematic representation of the apparatus of FIG. 1.
Figure 2:
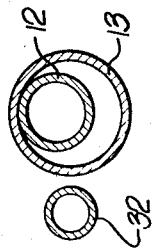
FIG. 2 is a section view of the apparatus of FIG. 1 taken along the plane II–II therein.

A detailed explanation of tan apparatus for use in determining the total mass of certain constituents of exhaust gas emissions from an internal combustion engine will now be made. Referring particularly to FIGS. 1 through 3, a vehicle 10 is shown positioned upon a vehicle-testing dynamometer apparatus 11 which may be constructed in accordance with the disclosure of U.S. Letters Pat. No. 3,491,587. It is contemplated that the vehicle will be run at different speeds under different operating conditions in conjunction with varying loads applied through the dynamometer in accordance with an established sequence of vehicle engine testing operations, such as that as has been established by the California Air Resources Board and the National Center for Air Pollution Control, commonly referred to as the seven-mode or 10-mode cycle.

The internal combustion engine of vehicle 10 is provided with an exhaust system including exhaust pipe 12 through which the exhaust gases are emitted normally to the atmosphere. In accordance with the present sampling apparatus and method, a flexible hose or conduit 13 is positioned over and about the vehicle exhaust pipe 12 to receive the exhaust gases emitted from the vehicle engine. As best seen in FIG. 2, the inside diameter of flexible hose 13, about four inches in the preferred embodiment, is considerably larger than the outside diameter of exhaust pipe 12 so that the inlet of hose or conduit 13 is in gas-receiving communication with both the exhaust pipe 12 and the ambient air about the exhaust pipe.

In accordance with the present invention, a flow-through conduit or duct 14 having a flow control valve means therein, indicated generally at 15, is placed in communication by flex hose 13 with the exhaust gases emitted from the engine of vehicle 10. An air blower or positive displacement air pump 16 is connected to the outlet end 17 of duct 14 to draw exhaust gases and air through the duct. The capacity of blower or pump 16 must be such that it can draw ambient air and exhaust gas mixture through hose 13 and duct 14 at a volumetric flow rate well in excess of the maximum volumetric flow rate of gases expected to be emitted by the vehicle engine through exhaust pipe 12. The dilution sampling method utilized by the present invention requires volumetric gas flow rates on the order of about 100 to 300 cubic feet per minute, depending upon the size of and the emission rate of the vehicle engine exhaust system.

During a test run, the vehicle is operated through different modes of operation producing varying concentrations of unburned hydrocarbons, nitrogen oxides, carbon monoxide or other pollutants or constituents in the exhaust gases drawn into the through-flow duct 14 by blower 16. The flow rate of the exhaust gas emissions also varies during the different modes of operation of the vehicle engine. However, blower 16 attempts to maintain a constant volumetric flow rate through duct 14 by drawing in varying amounts of ambient air to compensate for the rise or fall in the volumetric flow rate of exhaust gases entering the intake of duct 14 provided by hose 13. Thus, for a given temperature of exhaust gases, the volumetric flow rate of the ambient air and exhaust gas mixture through duct 14 during a test period is constant. However, the temperature of the exhaust gases varies during operation of the vehicle through different modes of operation producing a different mass flow for the same volumetric flow rate. As particularly contemplated within the present invention, and as will be described in detail hereinafter, valve means 15 is operated during a testing period or cycle to vary the actual volumetric flow rate of air and gas mixture through duct 14 in order to maintain a constant mass flow rate of air and exhaust gas mixture through the duct during the sampling operation.

A proportional sample of the air and exhaust gas mixture passing through duct 14 is obtained during a test cycle through use of the gas-sampling means indicated generally at 18. Such means, in the preferred exemplary embodiment, include a sampling tube 19, preferably made of heat dissipating stainless steel tubing, having an inlet 20 (see FIG. 3) positioned within duct 14 in the path of the flow of gases through the duct. A positive displacement air pump 21 is associated with gas sample line 19 and is operated during a test period to draw a sample of the air and gas mixture from the duct at a constant volumetric flow rate. We have found that a desirable range for the sampling flow rate is between 2 and 10 cubic feet per hour. The exhaust gas and air sample drawn by pump 21 through inlet 20 and conduit 19 is directed by conduit 22, preferably stainless steel tubing, through a solenoid-operated selector valve 23 and into an expandable container or bag 24. Bag 24 is preferably a sterilized plastic bag, or a previously used bag which has been completely purged and emptied prior to the test. In the exemplary embodiment, bag 24 is shown hung by a suitable hanger 25 with a bottom orifice therein receiving the outlet tube 26 of valve 23. Solenoid means 27, of standard construction, may be employed for operating a two-way selector valve within valve means 23 to selectively connect bag 24 to conduit 22, to receive a gas sample, and thereafter to line 28, which may be connected to a gas analyzer apparatus.

According to the method and apparatus of the present invention, a proportional sample of the total air and exhaust gases passing through duct 14 is drawn at a constant volumetric flow rate into the container or bag 24 during the entire test period. This sample may then be directed through a gas analyzer apparatus to determine the concentration of hydrocarbons, carbon monoxide, nitrogen oxides or other constituents or pollutants in the exhaust gas emissions. The total mass of such constituent or pollutant can then be calculated by multiplying the concentration (the percentage) of such constituent or pollutant found in the sample, times the total mass of air and exhaust gases passed through the duct during a test. Such total mass of exhaust gases and air is easily calculated by multiplying the volumetric flow rate of air and gas mixture established by blower 16 through duct 14 by the time the test was run and then multiplying that product by the known density of air. Such total mass or weight of a constituent emitted during a test run can also be equated to miles of vehicle operation by determining how far the vehicle would have gone during the particular test run on the dynamometer 11.

Since the gas and air mixture passed through duct 14 includes ambient air drawn into the duct, the sample obtained in bag 24 during a test period includes a quantity of pollutants or gas constituents which are present in the ambient air. This may be significant when a testing operation is conducted in a location where the ambient air has a high concentration of such pollutants, as may occur on a very "smoggy" day or in a relatively confined area where vehicle exhaust emissions have contaminated the ambient air. It is therefore contemplated that an ambient air sample will be taken in accordance with the present method, the concentration of constituents therein determined and the mass of such constituents subtracted from the result determined for the total air and gas mixture.

As seen in FIG. 1, an ambient air inlet tube 29 is mounted to the flex hose 13 by bands 30, 31, to place its inlet opening 32 generally adjacent the inlet to flex hose 13. Hose 29 is connected into pump 21, which in the preferred embodiment, is a dual head pump for pumping both the air and gas sample through lines 19 and 22 at the identical rate as it pumps ambient air through lines 29 and 33. The ambient air pumped through line 33 is directed through a second solenoid operated selector valve 34 into bag or container 35. Bag 35 is supported by a suitable hanger 36 in communication with the outlet 37 of valve 34. A typical solenoid means 38 may be associated with valve 34 to operate a selector valve mechanism therein to connect bag 35 either to line 33 for receiving an air sample during a test, or to line 39 after a test is run so that the collected air sample may be passed directly to a gas analyzer apparatus, not shown. Solenoid means 27 and 38 may be operated by a common electrical control means so that both sampling bags 24 and 35 are opened to the constant flow of air and gas supplied by dual head pump 21 and are simultaneously closed at the end of a test. The total mass of any given constituent may therefore be determined for the air mixed into the exhaust gases being drawn through duct 14 and may be subtracted from the total mass of such constituent previously determined from the air and gas mixture sample in bag 24.

It is essential that a constant mass or weight flow of air and exhaust gases be maintained through duct 14 during a test period in order that the calculation of total mass of any given constituent, described hereinbefore, be accurate. If the percentage of a given constituent (its concentration) determined from the sample in bag 24 is multiplied by an inaccurate total mass of air and gas mixture supposedly passed through conduit 14, an inaccurate result is obtained. It is therefore contemplated within the method and apparatus of the present invention that after an initial volumetric flow rate of air and exhaust gases through duct 14 is established, means provided in accordance with the present invention vary the actual volumetric flow rate air and gas through duct 14 in response to changes in temperature of the exhaust gases in a manner to maintain a constant mass or weight flow of the mixture through the duct during varying gas temperature and flow from the vehicle engine during a testing period. This is accomplished by the present invention by controlling the valve means, indicated generally at 15, in the duct in response to both the volumetric flow rate of air and gas mixture flowing through the duct and the temperature of such mixture, as hereinafter explained.

Referring to FIGS. 1 and 3, valve means are provided within duct 14 for controlling the volumetric flow rate of gases through the duct. In the exemplary embodiment, such valve means includes a butterfly valve 40 pivotally mounted by axle members 41 and 42 journaled in apertures in the side of duct 14. A servomotor means 43 is provided to control the positioning of valve 40 in duct 14, the valve axle 42 being connected directly into the gear reduction means associated with the servomotor. The operation of motor 43 is controlled by a control unit 45 which is associated with flow rate sensing means and temperature sensing means as hereinafter explained.

Volumetric flow rate sensing means are associated with the through-flow duct 14 for sensing the volumetric flow rate of gases passing through the duct at any given instant during the operation thereof. In the exemplary embodiment, such means, indicated generally at 46, include a restriction in the duct for creating a pressure differential thereacross and means for measuring such pressure differential. As seen in FIG. 3, a metering orifice 47 is mounted across the inner diameter of duct 14 to restrict the flow of gases from the inlet end connected to hose 30 toward the valve means indicated generally at 15. Means for measuring this pressure drop or differential are provided and, in the exemplary embodiment, include a pressure transducer means 48 connected by lines 49 and 50 to the upstream and downstream sides of orifice 47, respectively. Transducer 48 may be of conventional construction including a diaphragm having one side exposed to the gas pressure in line 49 and the other side to gas pressure in line 50. Movement of the diaphragm is thus a function of the differential pressure or pressure drop across the orifice 47. Such diaphragm movement may be converted in generally known manner, including the use of electrical circuitry including strain gauges associated with the diaphragm, to an output signal which is a function of the pressure drop across the orifice, and consequently is a function of the volumetric flow rate of gases through duct 14. This pressure transducer signal is conveyed by electrical lines 51 and 52 to the control unit 45.

Temperature sensing means are associated with the duct 14 for sensing the temperature of gases passing through the duct at any given instant during operation thereof. In the exemplary embodiment, such temperature sensing means includes a temperature transducer means indicated generally at 53 and which includes a sensor 54 positioned withing duct 14 in the path of gases flowing through the duct. As seen in FIG. 3, sensor 54 is mounted by insulator member 55 to the duct sidewalls with electrical lead lines 56 and 57 running to the control unit 45. Sensor 54 produces an output or error signal, which is a function of the temperature of gases flowing through the duct, which is transmitted to the control unit 45.

As particularly contemplated within the present invention, a command or control signal is sent from the control unit 45 by electrical lead lines 58 and 59 to the servomotor 43 for regulating the positioning of valve 40, said control signal being a function of both the flow rate of gases flowing through the duct and the temperature of gases flowing through the duct. Control unit 45 includes electrical means for receiving the error signal and the pressure transducer output signal, combining them and producing the command signal. Exemplary circuitry will be described later in connection with FIG. 4.

Assuming that an initial volumetric flow rate of 100 cubic feet per minute is desired, the blower 16 may be turned on and the control unit adjusted to produce such initial rate, as sensed by pressure transducer means 48. During a testing operation, as the exhaust gases rise in temperature, the control unit senses the rising temperature by means of sensor 54 and directs the servomotor 43 to open valve 40 to allow an increase in volumetric flow rate. Such increased volumetric flow rate is then sensed by the pressure diaphragm associated with transducer 48 and a pressure transducer signal is sent to the control unit indicating the higher flow rate. When the electrical bridge circuit associated with the pressure transducer 48 is in electrical balance with the electrical bridge circuit associated with sensor 54, the control unit will hold valve 40 in the adjusted position. As long as the temperature and flow rate bridges are in balance, the valve remains in its given position. When the bridges are out of balance, as when temperature changes, the electrical unbalance develops a control or error signal to the servomotor, through an appropriate amplifier, to adjust the valve accordingly.

In FIG. 4 there is shown a preferred circuitry of a system for maintaining constant the rate of mass flow of the gas in duct or conduit 14. The system in accordance with the present invention as exemplified by this circuit permits the operator to select a certain "standard" mass flow for a particular vehicle being tested. As previously explained, it is desirable that the mass flow surely exceed the actual mass of exhaust gas of the vehicle being tested; and it is further desirable that such excess not be very great. In other words, it is desirable that some air be drawn into the conduit, and that the proportion of such outside air to the total gas flow in the conduit be fairly small.

Thus, for any given test, the exact value of the "standard" mass flow is not particularly significant, but it is vitally important that the selected value be maintained constant throughout the test. The principal factor which, if uncorrected, would cause changes in the mass flow is a change of temperature of the gas in the conduit. As is well known, the density of a gas varies with temperature. Thus, if the velocity of gas flow were maintained constant while temperature is changing, the mass flow of gas would change, thereby introducing error into the measurement made in accordance with the present invention. The circuitry of FIG. 4 provides a system for maintaining constant the "standard" mass flow rate selected by the operator.

Referring now in detail to FIG. 4, the system there shown includes a temperature sensing means enclosed within a dotted outline indicated generally at 80, a major component of which is a Wheatstone bridge indicated generally at 82. A power supply such as a battery 84 is connected through a switch 85 and a resistor 86 to a potentiometer 88 having an adjustable slider 89. The voltage picked off by slider 89 is measured and indicated by a gauge indicated generally at 90, which is desirably calibrated in terms of standard cubic feet per minute of gas flow in the conduit of the present device. The voltage thus indicated is fed through lines 91 and 93 to vertices 93 and 94 respectively of bridge 82. The bridge includes a trimming resistor 95 having a slider 96, and that slider and vertex 97 constitute the output terminals of the bridge. It will be noted that one of the arms of the bridge, including resistor 98, includes also a temperature probe indicated generally at 100, having a resistor 102 made of a material, platinum being preferred, having a temperature coefficient which is substantially constant throughout the range of temperatures to be encountered in operation of the present device. The bridge is calibrated by the use of slider 96 on resistor 95 so that the extrapolated plot of resistance vs. temperature intersects zero resistance at absolute zero. Thus the output signal appearing at vertex 97 and fed to line 105 will be linear with absolute temperature of the probe 100, and consequently of the gas flow sensed thereby.

Means are provided in accordance with the present invention for generating a signal which is a function of the velocity of gas flow in the conduit of the present apparatus. As appears in FIG. 4, such means are here shown as enclosed in dotted outline indicated generally at 110, and corresponding functionally with transducer 48 previously described in connection with FIG. 1. The major component within circuitry 110 is a Wheatstone bridge indicated generally at 112 and including the conventional four arms each having therein a variable resistor, 113, 114, 115 and 116. Each of these resistors may constitute a strain gauge or the like for measuring the excursion of a diaphragm subjected to the differential pressure appearing in tubes 49 and 50 previously described. The circuitry 110 also desirably includes calibrating means, including a resistor or voltage divider 120 and slider 121 movable therealong, the slider being connected through a resistor 122 to vertex 123 of the bridge. It will be noted that line 105, carrying the output signal of the temperature transducer 80, is also connected to the same vertex 123 of the bridge.

Bridge 112 is energized by a power source such as a battery 128 through a switch 129, the output of the battery being applied through lines 130 and 131 to input vertices 132 and 133 respectively of the bridge. The other remaining vertex 134 of the bridge is connected to an output terminal 135, and the other output terminal 136 is connected through line 137 with slider 96 of Wheatstone bridge 80 previously described.

The output signal appearing between terminals 135 and 136 is adapted to be fed through suitable amplifier means or the like to control motor 43 which in turn adjusts the position of a butterfly valve 40, as previously described.

The circuitry of FIG. 4 operates in the following manner. For any temperature of the gas within the conduit, as sensed by probe 100, the temperature-sensing circuit 80 produces an output or error signal across vertices 96 and 97 which is linear with the sensed absolute temperature. Considering for the moment vertex 96 to be a reference, the signal at 97, referred to herein as the error signal, is fed through line 105 to vertex 123 of the differential pressure sensing means 110. Within the latter circuitry, the voltage or potential difference between vertices 123 and 134 varies linearly with differential pressure as measured in the manner hereinabove described, and thus varies with velocity of gas flow in the conduit. The polarities of the circuitry are such that the signal between vertices 123 and 134 bucks the signal in line 105. Thus, when the system is in balance, the error signal appearing in line 105 is equal and opposite to the signal appearing across vertices 123 and 134 and as a result the output or command signal appearing across output terminals 135 and 136 is zero.

When, now, the temperature of the gas in the conduit changes, probe 100 senses that change and Wheatstone bridge 82 generates an output signal in line 105 which is different from the error signal as it existed before the temperature change. More specifically, the magnitude of the signal in line 105 will be linearly proportional to the absolute temperature of resistor 102 of probe 100. Under these conditions, the output signal of the pressure transducer appearing across vertices 123 and 134 will no longer be exactly equal and opposite to the changed signal in line 105. As a consequence, a voltage or command signal will appear across output terminals 135 and 136 which in known manner will energize the motor 43 to adjust butterfly valve 40 to produce either a higher velocity or lower velocity flow, whichever is needed to bring the signals of the two bridges into balance.

Thus, if the absolute temperature of probe 100 rises, indicating that the density of the gas has proportionally decreased, an increased velocity of gas flow will be needed in order to maintain the desired constant mass rate of flow of the gas. The polarities and direction of rotation of motor 43 are so chosen to accomplish this, the system thus operating in an inverse feedback manner.

It will be understood that the term "error signal" as here used is actually a measure of the absolute temperature of the probe and thus of the gas, rather than a measure of the deviation of the temperature from an established norm, as "error signal" frequently signifies. Otherwise stated, under steady state conditions the temperature transducer continuously produces an "error" signal which is continuously compared with the signal produced by the differential pressure transducer. The difference of magnitude of the two signals becomes the command signal. The magnitude of such command signal may or may not be significant in controlling the speed of the servomotor adjusting the butterfly valve, but its polarity is of course important. Thus the present system is well adapted for solid-state circuitry.

From the foregoing, it can be seen that the methods and apparatus of the present invention provide for maintaining a constant mass or weight flow of the air and exhaust gas mixture drawn through duct 14 during a given testing period. Identical volumes of air-gas and air samples are uniformly sampled during the test to obtain true proportional samples of the total mass of the air and exhaust gases drawn through the duct. The actual weight or mass of a given pollutant emitted by a vehicle due to its internal combustion engine drive can then be very accurately determined.

The methods and apparatus for mass emission sampling of motor vehicle exhaust of the present invention, particularly when used in conjunction with the mobile vehicle dynamic testing rig of U.S. Pat. No. 3,491,587, are very well suited for use in surveillance testing and enforcement testing out on the highways as well as for initial certification testing of vehicles.

Having thus described a preferred exemplary embodiment of the present invention:

We claim:

1. In an apparatus for use in determining the total mass of certain constituents of exhaust gas emissions from internal combustion engines, said apparatus including a through-flow duct associated with the engine exhaust system and an air drive means for drawing engine exhaust gases through said duct, the improvement comprising the provision of:
   valve means in said duct for controlling the volumetric flow rate of gases through said duct;
   volumetric flow rate sensing means associated with said duct for sensing the volumetric flow rate of gases passing through said duct at any given instant during operation thereof;
   temperature sensing means associated with said duct for sensing the temperature of gases passing through said duct at any given instant during operation thereof;
   valve control means associated with said flow rate sensing means and temperature-sensing means for operating said valve means to provide an initial volumetric flow rate of gases through said duct at an initial gas temperature and to modify said flow rate in response to changing gas temperatures in said duct to provide a constant mass flow rate of gases through said duct during an engine exhaust gas-sampling time period; and
   gas-sampling means for constantly collecting at a uniform flow rate a sample portion of the gases flowing through said duct,
   whereby the total mass of a given constituent in the total mass of exhaust gases emitted during said time period is closely approximated by the product of the concentration of said constituent in said sample portion and the total mass of exhaust gases passed through said duct.

2. The apparatus of claim 1 wherein:
   said valve control means includes a servomotor means associated with said valve means;
   said temperature-sensing means includes a temperature transducer means for producing a first output signal which is a function of the temperature of gases flowing through said duct at any instant;
   said volumetric flow rate sensing means includes a restriction in said duct for creating a gas pressure differential thereacross indicative of volumetric flow rate therethrough; and
   electrical means for modifying said first output signal in response to the magnitude of said pressure differential, said electrical means including a pressure differential transducer means adapted to sense the differential in gas pressure across said restriction and for producing a control output signal to said servomotor means which is a function of both said temperature of gas in said duct sensed by said temperature sensing means and the volumetric flow rate of gases through said duct sensed by said flow rate sensing means,
   said control signal operating said servomotor means to control the positioning of said valve means.

3. The apparatus of claim 1 wherein:
   said through-flow duct is connected by a flexible conduit to the exhaust pipe of a vehicle engine exhaust system and said conduit is open to ambient air as well as to said engine exhaust; and
   said gas drive means operates to draw a minimum volumetric flow rate of a mixture of ambient air and exhaust gases which is greater than the maximum exhaust gas volumetric flow rate attainable by said vehicle engine.

4. The apparatus of claim 1 wherein said volumetric flow rate sensing means comprises:
   a metering orifice in said duct for creating a pressure drop across an opening of known diameter; and
   a differential pressure-sensing means and gas conduit means for connecting said pressure-sensing means to said duct upstream and downstream of said orifice to sense the pressure differential across said orifice at any given instant.

5. The apparatus of claim 4 wherein said volumetric flow rate sensing means also comprises:
   differential pressure transducer means for converting said differential pressure value into an electrical output signal which is a function of said differential pressure magnitude.

6. The apparatus of claim 1 wherein said temperature sensing means comprises:
   a sensor disposed in the path of exhaust gases passed through said duct and electrical means for amplifying and sending the output signal of said sensor to said valve control means.

7. An apparatus for collecting a sample of exhaust gases from an internal combustion engine comprising:
   a gas through-flow conduit and means for drawing all of said engine exhaust gases through said conduit;
   valve means in said conduit and valve control means associated with said valve means for controlling the volumetric flow rate of exhaust gas through said conduit in response to changes in temperature of said exhaust gases; and
   means for withdrawing a sample of said exhaust gases from said conduit during a test run of said engine.

8. An apparatus as in claim 7 wherein:
   said means for drawing all of said engine exhaust gases through said conduit includes a conduit intake portion positioned about the exhaust outlet of said engine in intake communication with said engine exhaust gases and the ambient air.

9. An apparatus as in claim 8 wherein:
   said means for drawing all of said engine exhaust gases through said conduit also includes an air blower means associated with said conduit for constantly drawing an air and exhaust gas mixture through said conduit at a greater volumetric flow rate than the maximum volumetric flow rate of exhaust gases attainable by said engine.

10. An apparatus as in claim 7 wherein said valve control means comprises:
    temperature sensing means associated with said conduit for sensing the temperature of gases flowing through said conduit and including temperature transducer means for producing an electrical output signal which is a function of the temperature sensed.

11. An apparatus as in claim 10 including:
    means for sensing the volumetric flow rate of gases flowing through said conduit;
    electrical means associated with said last-named means for modifying said temperature transducer output signal in response to the volumetric flow rate of gases flowing through said conduit to produce a control signal; and
    means for operating said valve means in response to said control signal whereby said valve means is operated as a function of both the temperature and volumetric flow rate of gases flowing through said conduit.

12. An apparatus as in claim 11 wherein:
    said means for sensing the volumetric flow rate of gases flowing through said conduit includes a metering orifice in said conduit and means for measuring the differential pressure across said orifice; and
    said electrical means includes pressure transducer means for producing an output signal which is a function of the magnitude of said differential pressure.

13. An apparatus as in claim 8 wherein said means for withdrawing a sample of said exhaust gases includes:
    a sampling tube having an inlet located in the path of flow of said gases in said conduit;
    pump means for drawing a constant flow of gases from said conduit during said test run to obtain a sample thereof; and
    container means for receiving said sample, said container being connected by a gas line to said sampling tube.

14. An apparatus as in claim 13 including:
    a selector valve in said gas line;
    a second gas line to be connected to a gas analyzer; and
    means for operating said valve to selectively connect said container with said sampling tube or with said second gas line to said analyzer.

15. An apparatus as in claim 7 including an ambient air-sampling means comprising:
- an inlet tube having an air inlet positioned in the general area of said internal combustion engine to receive air ambient to said engine;
- an air pump means associated with said inlet tube for drawing said ambient air at a constant flow rate into said tube; and
- an air sample container connected to said inlet tube to receive said air sample.

16. An apparatus as in claim 15 wherein:
said pump means for drawing said gas sample and said air pump means comprise a dual head pump for pumping both said gas sample and said ambient air sample at the identical volumetric flow rate.

17. A method of obtaining a proportional sample of total exhaust gas emission of an internal combustion engine during operation of said engine to measure the total mass of a given constituent in said emissions comprising the steps of:
- drawing all of said engine exhaust gases through a flow-through duct at a given initial volumetric flow rate;
- maintaining a constant mass flow of said gas through said duct by varying actual volumetric flow rate in response to change in temperature of said gas during a test period;
- withdrawing a proportional sample of said gas from said duct at a generally constant volumetric flow rate during said test period; and
- determining the concentration of a given constituent in said sample and computing the total mass of said constituent emitted by said engine during said test period from the product of said concentration and total mass of air passed through said duct.

18. The method of claim 17 including the step of:
introducing additional gas comprising ambient air in sufficient amounts during said step of drawing all of said engine exhaust gases through said flow-through duct at a minimum volumetric flow rate for said gases which is in excess of the maximum volumetric flow rate of exhaust gases said engine is capable of emitting during a test period.

19. The method of claim 17 including the steps of:
sensing the volumetric flow rate of gases drawn through said duct during said test, and
varying the actual volumetric flow rate of said gases drawn through said duct in response to changes in both the temperature and flow rate.

20. The method of claim 19 including the steps of:
producing a first command electrical signal which is a function of the temperature of gases drawn through said duct;
modifying said first command signal by introducing thereinto an electrical signal produced as a function of the volumetric flow rate of gases drawn through said duct to produce a modified control signal; and
controlling the volumetric flow rate of gases through said duct as a function of said control signal.

21. The method of claim 17 including the steps of:
adjusting the position of a valve in said duct to vary the actual volumetric flow rate of gases drawn through said duct in response to changes in both the temperature and volumetric flow rate of gases drawn through said duct.

22. The method of claim 21 including the steps of:
producing a first command electrical signal which is a function of the temperature of air and exhaust gases drawn through said duct;
modifying said first command signal by an electrical signal produced as a function of the volumetric flow rate of air and exhaust gases drawn through said duct to produce a modified control signal; and
adjusting the position of said valve by said control signal.